G. M. BARD.
VALVE DEVICE.
APPLICATION FILED JAN. 13, 1911.

1,166,571.

Patented Jan. 4, 1916.

Witnesses,
Edward T. Wray.
Edna K. Reynolds.

Inventor,
George M. Bard
by Parker & Carter
Attorneys.

UNITED STATES PATENT OFFICE.

GEORGE M. BARD, OF CHICAGO, ILLINOIS, ASSIGNOR TO BARCO BRASS & JOINT COMPANY, OF CHICAGO, ILLINOIS, A CORPORATION OF ILLINOIS.

VALVE DEVICE.

1,166,571.  Specification of Letters Patent.  Patented Jan. 4, 1916.

Application filed January 13, 1911. Serial No. 602,406.

*To all whom it may concern:*

Be it known that I, GEORGE M. BARD, a citizen of the United States, residing at Chicago, in the county of Cook and State of Illinois, have invented a certain new and useful Improvement in Valve Devices, of which the following is a specification.

This invention relates to improvements in valve devices, and has for its object to provide a new and improved device of this description.

The invention is illustrated in the accompanying drawings, wherein—

Figure 2:
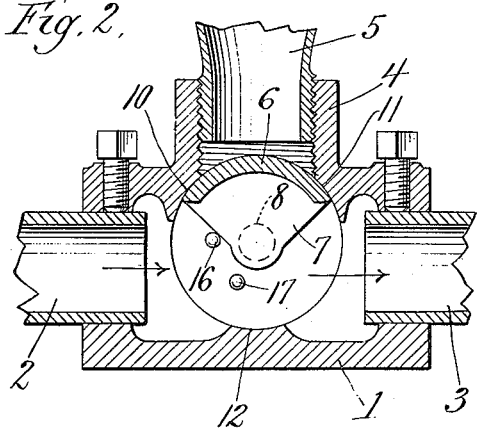
Figure 1:
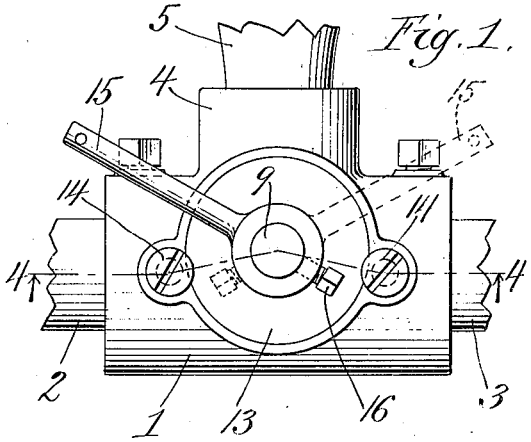
Figure 3:
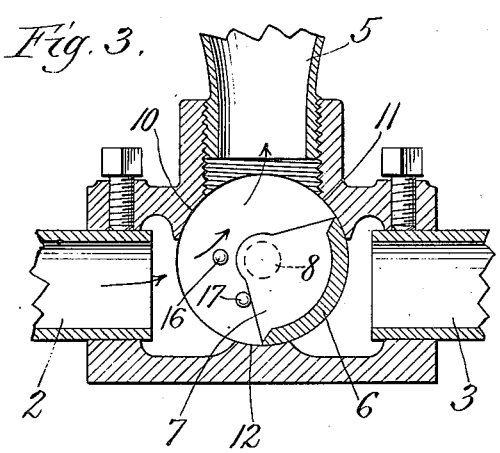
Figure 4:
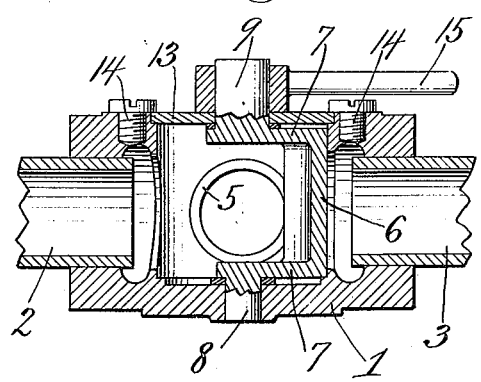
Figure 5:
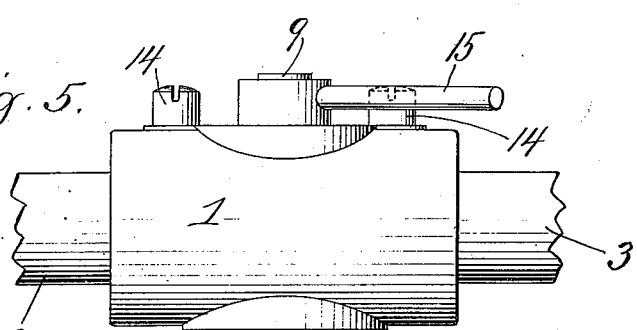

Figure 1 is a plan view of a valve device embodying the invention; Fig. 2 is a sectional view of the valve device shown in Fig. 1; Fig. 3 is a sectional view similar to Fig. 2, showing the movable part of the valve device in a different position; Fig. 4 is a sectional view taken on line 4—4 of Fig. 1; Fig. 5 is a view showing a modified construction.

Like numerals refer to like parts throughout the several figures.

This device can be used for various purposes, and under various conditions. For purposes of illustration, I have shown it as applied to the exhaust of an automobile engine, and used for the purpose of diverting the exhaust through the horn when it is desired to give forth a signal.

Referring now to the drawings, I have shown a casing 1, having an inlet 2 and an outlet 3 for the exhaust of the engine under ordinary conditions. The casing is also provided with another outlet 4 to which is connected the automobile horn 5. Connected with the casing 1 is a movable valve piece 6 provided with laterally projecting end pieces 7 which project toward the middle of the casing. Associated with the ends of these projecting end pieces are the connecting pieces 8 and 9, which project into openings in the casing, and by means of which the valve piece 6 is pivotally held in the casing. Located within the casing are three seating faces 10, 11 and 12, for the movable valve piece 6.

In the ordinary operation of the device, when used in connection with an automobile exhaust, the movable valve piece 6 is in engagement with the seating faces 10 and 11, as shown in Fig. 2, so as to close the passageway leading to the horn 5. If it is desired to operate the horn, the movable valve piece 6 is moved so as to make contact with the seating faces 11 and 12, as shown in Fig. 3. The exhaust is now prevented from passing through the casing 6 and directed into the horn 5. It will be noted that when the movable valve piece 6 is moved to engage the seating faces 10 and 11, so as to close the passageway to the horn 5, said movable valve piece is in such position that it leaves an unobstructed passageway through the casing for the exhaust of the engine. When the device is used in connection with the exhaust of an automobile engine, this feature is very desirable, for the area of the exhaust is not diminished by the valve.

As illustrated in the drawing, the connecting piece 8 fits into a hole in the bottom of the casing 1, while the connecting piece 9 passes through an opening in the removable part 13 connected with the casing. This removable part is held in place in any desired manner, as by means of the screws 14. The movable valve piece 6 is controlled in any desired manner, as by means of the handle 15, connected with the connecting piece 9. As shown in Figs. 1 and 4, the end of this handle fits over the connecting piece 9 and is connected thereto by a set screw 16 so that its position can be varied to meet the conditions presented in placing the device in position, and to avoid obstructing parts.

Some means is provided for limiting the movement of the valve piece 6, so that the operator can tell when it has been moved to its proper position. As shown in Figs. 2 and 3, I provide stops 16 and 17 located in the valve casing. The stop 16 stops the valve piece 6 when it is moved to shut off the horn, while the stop 17 stops said valve piece when it is moved to direct the exhaust through the horn. These stops may be integral with the casing. By this construction it will be seen that the handle 15 can be moved around in any position to avoid obstructing parts which might limit its movement if fastened in any particular position. As shown in Fig. 5, the stops are located outside of the casing, and consist of the heads of the screws 14, which are enlarged so as to engage the handle 15. In this case, the handle is fixed to the connecting piece 9 so that it will always be in the same position with relation to the screws 14. It will be noted that the handle connects the valve piece 6 and associated parts with the movable part 13, so that by simply manipulating the screws 14, the piece 13 and the valve piece and associated parts may be readily removed from the casing while the device is in position on the automobile, in order that the valve device may be easily cleaned or repaired.

I claim:

1. A valve device comprising a casing provided with three openings, and having a passageway therethrough with which said openings communicate, a movable valve piece for controlling two of said openings, said valve piece at one side of said passageway when closing one of said openings so as to leave the passageway unobstructed, and extending across said passageway when closing the other opening, a handle outside of said casing and connected with said movable valve piece, and two stops projecting into said passageway, both of said stops located on the same side of a plane passing through the axis of the valve and the center of the opening closed by the valve piece when at one side of said passageway.

2. A valve device comprising a casing, provided with three openings, and having a passageway therethrough, a movable valve piece provided with laterally projecting parts extending toward the middle of said casing, connecting pieces pivotally connecting said laterally projecting pieces with the casing, so that said valve piece may be moved to alternately open and close two of said openings, one of said connecting pieces projecting through the casing, a controlling device connected therewith, and stop devices near the middle of said passageways for stopping the movable valve piece when moved to close either opening. said stop devices consisting of two separated projections on the bottom of said casing and on the same side of a plane at right angles to said passageway and passing through the axis of said valve.

3. A valve device comprising a casing, provided with three openings, and having a passageway therethrough, a movable valve piece provided with laterally projecting pieces extending toward the middle of said casing, connecting pieces integral with said laterally projecting pieces pivotally connecting said laterally projecting pieces with the casing, so that said valve piece may be moved to alternately open and close two of said openings, one of said connecting pieces projecting through the bottom of the casing, a removable piece having a smooth peripheral edge removably connected with said casing and through which the other said connecting piece passes, and a controlling device engaging said removable piece and connected with said connecting piece on the outside of said removable piece so as to hold the movable piece and valve together, whereby when the removable piece is removed the valve piece is removed from the casing.

GEORGE M. BARD.

Witnesses:
P. J. GATHMANN,
EDNA K. REYNOLDS.